United States Patent [19]
Richert et al.

[11] Patent Number: 5,365,856
[45] Date of Patent: Nov. 22, 1994

[54] COIL TRANSPORTATION SYSTEM

[75] Inventors: Withold Richert, Hückelhoven; Martin Pfannschmidt, Heiligenhaus, both of Germany; Johan Aelter, Maaseik,

[73] Assignee: SMS Schloemann-Siemag Aktiengesellschaft, Düsseldorf, Germany

[21] Appl. No.: 60,338

[22] Filed: May 11, 1993

[30] Foreign Application Priority Data

May 11, 1992 [DE] Germany .................. 4215430

[51] Int. Cl.$^5$ .................................... B60F 1/00
[52] U.S. Cl. .................................... 104/243; 104/247; 105/31; 105/72.2
[58] Field of Search .............. 104/242, 243, 244.1, 104/245, 247, 248, 130, 304; 105/31; 414/396, 401, 584

[56]        References Cited
         U.S. PATENT DOCUMENTS 3,645,211  2/1972  Gretzschel et al. .......... 104/242
3,680,488  8/1972  Donlon ...................... 104/130
3,759,187  9/1973  Gayot ....................... 104/130
3,774,543 11/1973  Welsh ....................... 104/130
3,945,455  3/1976  Hamada et al. ............... 104/247
4,015,539  4/1977  Hamada et al. ............. 104/244.1

FOREIGN PATENT DOCUMENTS

0264592  6/1963  Australia ................... 414/401
0009217  1/1977  Japan ....................... 104/130
0018619  2/1977  Japan ....................... 104/247

*Primary Examiner*—Mark T. Le
*Attorney, Agent, or Firm*—Anderson Kill Olick & Oshinsky

[57]                 ABSTRACT

A coil transportation system includes air cushion vehicles guided for traveling along a travel path comprising straight lines and curves. Each vehicle comprises mechanical side guides at its longitudinal right and left hand sides. The side guides are actuatable alternatively from the right and left hand sides. The side guides are arranged for associating with floor mounted routing guides, for guiding the air cushion vehicles along a travel path and transversely to the travel path.

7 Claims, 6 Drawing Sheets

COIL TRANSPORTATION SYSTEM

FIELD OF THE INVENTION

The present invention is directed no a coil transportation system with air cushion vehicles for straight line and curvillinear travel, especially for charging of reelers in front of and behind treatment installations and rolling stands.

BACKGROUND OF THE INVENTION

Coil transportation systems have, for the most part, one or two reel or wind-off devices and one or two coiling devices for winding of strip-shaped material into coils. The coil conveyance or transport, meaning the coil supply and removal, is performed through intermediate buffers and by coil trolleys with coil depositories cooperating with these buffers, as well as with the reel-off and reel-up devices for improved operational sequence.

Induction loop controlled air cushion vehicles for coil conveyance have been used (a) to obviate the need for additional conveyance devices such as walking beam or pallet conveyors if, for instance, the coil depository cannot be served by overhead cranes, b) for simplified integration of intermediate stations, (c) for removal of the baling cord, (d) for coil measuring and (e) weighing or preparation. In such cases, one works, for instance, with three buffer stations and two air cushion vehicles, which convey the coils having weights up to 40 tons laterally within two workshop halls. The air cushion vehicles are controlled by an induction loop embedded in the floor and are made to move by an electronic data process order from a governing or overriding process computer.

The travel drive consists of two hard rubber wheels, which are powered by two regulatable electric motors. The vehicle is provided with four air cushions in order to obtain a stable position of the load, which are centrally supplied with compressed air through a feed hose. If the air supply is switched on, the annularly shaped air cushions, consisting of a fiber-reinforced rubber material, expand and fill-up the spacing between the vehicle and the floor. As soon as the air cushions are sealed against the ground, the air pressure rises in the area bounded by the air cushion or bellows and the air cushions carrying the load are lifted up or rise.

If the air cushions are completely filled with air, a small quantity of air escapes outwardly beneath and around the air cushions. The load or the vehicle then "floats" on the produced air layer, practically without any friction (compare the product information Mover, "Air Layer Module.") The air cushion requires two antennas, one at the front and one at the rear for being guided by the induction loop. The antennas scan the eddy currents and are connected with on board computers for information or measured value-processing.

However, there are various disadvantages inherent in such known devices. The measured value processing and the vehicle control are complicated and expensive and the system is malfunction-prone. Furthermore an air cushion vehicle leaves the desired traveling path.

It is therefore an object of the to create a coil transportation or conveying system with air cushion vehicles, which permits a more malfunction-free operational sequence and in an economical manner.

SUMMARY OF THE INVENTION

These and other objects of the invention, which shall become hereafter apparent, are achieved by a Coil Transportation, System with air cushion vehicles for straight line and curvillinear travel, wherein the air cushion vehicle comprises, at its longitudinal side, mechanical side guides actuatable alternately from the right and left hand side, with routing guides assigned to said side guides, By thus making either the right or left side guide, referred to the traveling direction of the air cushion vehicle, to engage with the corresponding routing guide, the air cushion vehicle follows, in a constrained manner, the course of the routing guide without deviating from the present path.

The routing guide preferably comprises U-rails disposed in the mill floor, into which side guides, raisable and lowerable preferably by pneumatically operated cylinders, can be lowered as desired. Thus, when negotiating a left curve, the left side guide and when negotiating a right curve the right side guide is lowered into the U-rail.

Contrary to the known induction loop controlled air cushion vehicles, the friction wheel providing the vehicle motion is disposed in a rotary table because of the inventive mechanical guidance of the air cushion vehicle, enabling vehicle to change direction. Furthermore, any desired intermediate mediate stations can be accessed, and compared to conventional coil transport systems, a relatively malfunction-free operation is assured. The coil transport system permits optimum and flexible solutions also in tight spaces.

It is proposed that each side guide compromise cylinders with raisable and lowerable rollers. The cylinders are disposed vertically at the ends of a longitudinal beam, The rollers diminish the friction against the routing guides horizontal forces, if support or back-up roller bearings used as rollers. The rollers spaced from one another, according to the length of the beam, assure a two-point guidance of the vehicle where the two guide points assist in a backing-up manner to guide the air cushion vehicle to a new travel direction when negotiating curves.

It is further proposed to make the side guides shiftable horizontally, inwardly and outwardly so that the side guides can be used, for travel of the air cushion vehicle, transverse to the normal travel direction and the conveyed coil can be transported into or upon a coil storage or depository. During transverse travel, the rollers of the just stressed or loaded side guide abut in the U-rail anchored in the foundation. The side guides thus enable a flexible vehicle control since the vehicle can travel transversely to the left or right hand side.

If guide rods and adjustment spindles, connected to the longitudinal beams of the side guides, extend inside the vehicle and if the adjustment spindles are disposed in threaded receptacles, it is necessary only to screw the adjustment spindles more or less into the threaded receptacles in order to make the air cushion vehicle travel transversely. The spaced guide rods assure a tilt or jam-free transverse travel. The adjustment spindles of each side guide can be connected through a common drive shaft to a drive motor so that an electrical spindle drive can be realized for transverse travel of the air cushion vehicle.

According to another proposal in the invention, the air cushion vehicle is equipped with four idling air pads or cushions. Since these cushions must support only the weight of the air cushion vehicle itself, they are dimensioned to be considerably smaller than the known air pads or air cushions which carry the load when transporting the heavy coil weights and which, in the following, are called air cushions. Thus, after a coil has been deposited, the air cushion vehicle is again ready to travel within a much shorter time period since only the idling air cushions having a small volume have to be pressurized. However, the lifting height of the idling air cushions is selected in such a way that a sufficiently large intermediate space remains free between the coil located on a depository and the upper edge of the coil carrying saddles of the air cushion vehicle.

The carrying or support saddles of the air cushion vehicle can be expediently arranged on a rotary table, which permits 360° turns and therefore alignment of the coil upon the air cushion vehicle to correspond with the reel-off position.

In yet another proposal of the invention, the air cushion vehicle is equipped with a hose drum, driven so it can be rolled and unrolled. The pneumatic hose, with the embedded electric cable connected for energy supply to the air cushion vehicle, can thus be laid in a fixed position upon the foundation so as to be wear and friction-free while in the known air cushion vehicle, it must be dragged in its entire length across the foundation or the shop floor. The pneumatic nose can be torn open by friction and thus also results in damage to the embedded electric cable, raising also a considerable source of trouble and incendiary danger.

BRIEF DESCRIPTION OF THE DRAWINGS

The invention will be better understood by the Detailed Description of the Preferred Embodiment, in connection with the drawings, of which.

DETAILED DESCRIPTION OF THE PREFERRED EMBODIMENT

Figure 1A:
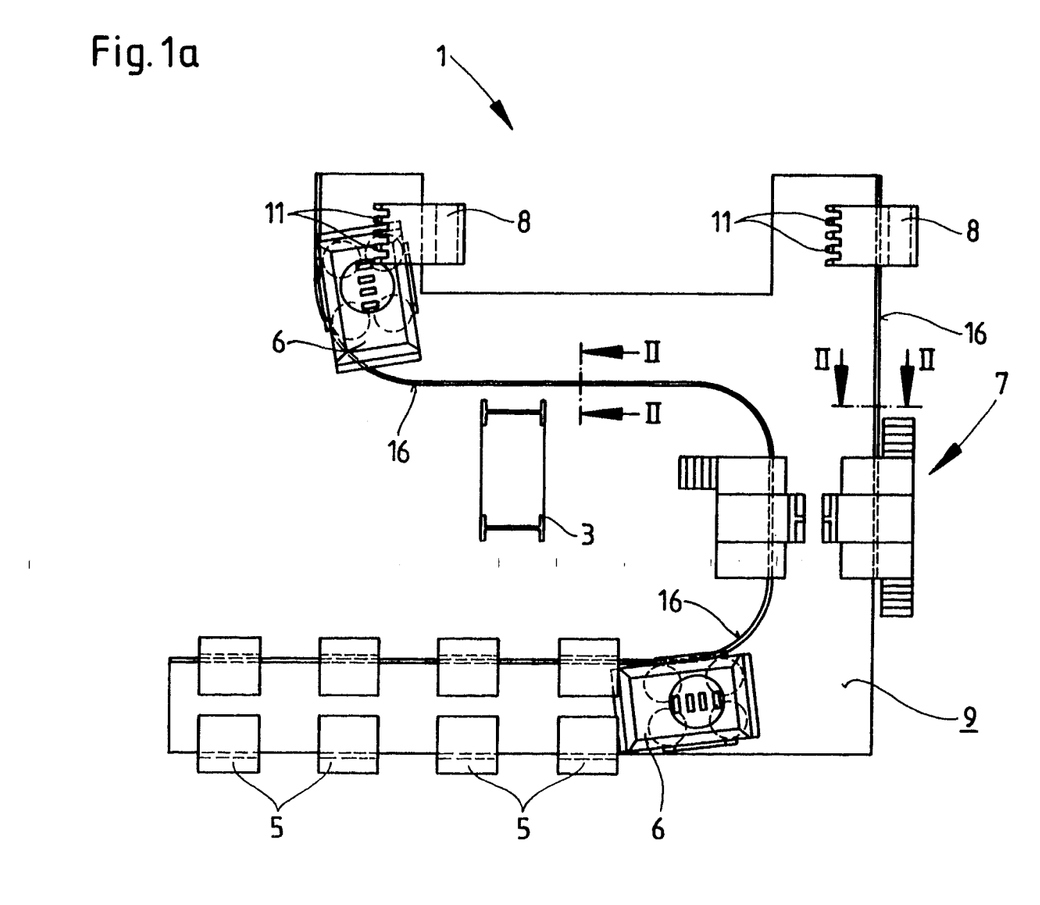
FIG. 1a and 1b depict the general layout of the entry and delivery part of a coil treatment or processing installation with mechanically guided air cushion vehicles for conveying the coils.
Figures 1B, 2:
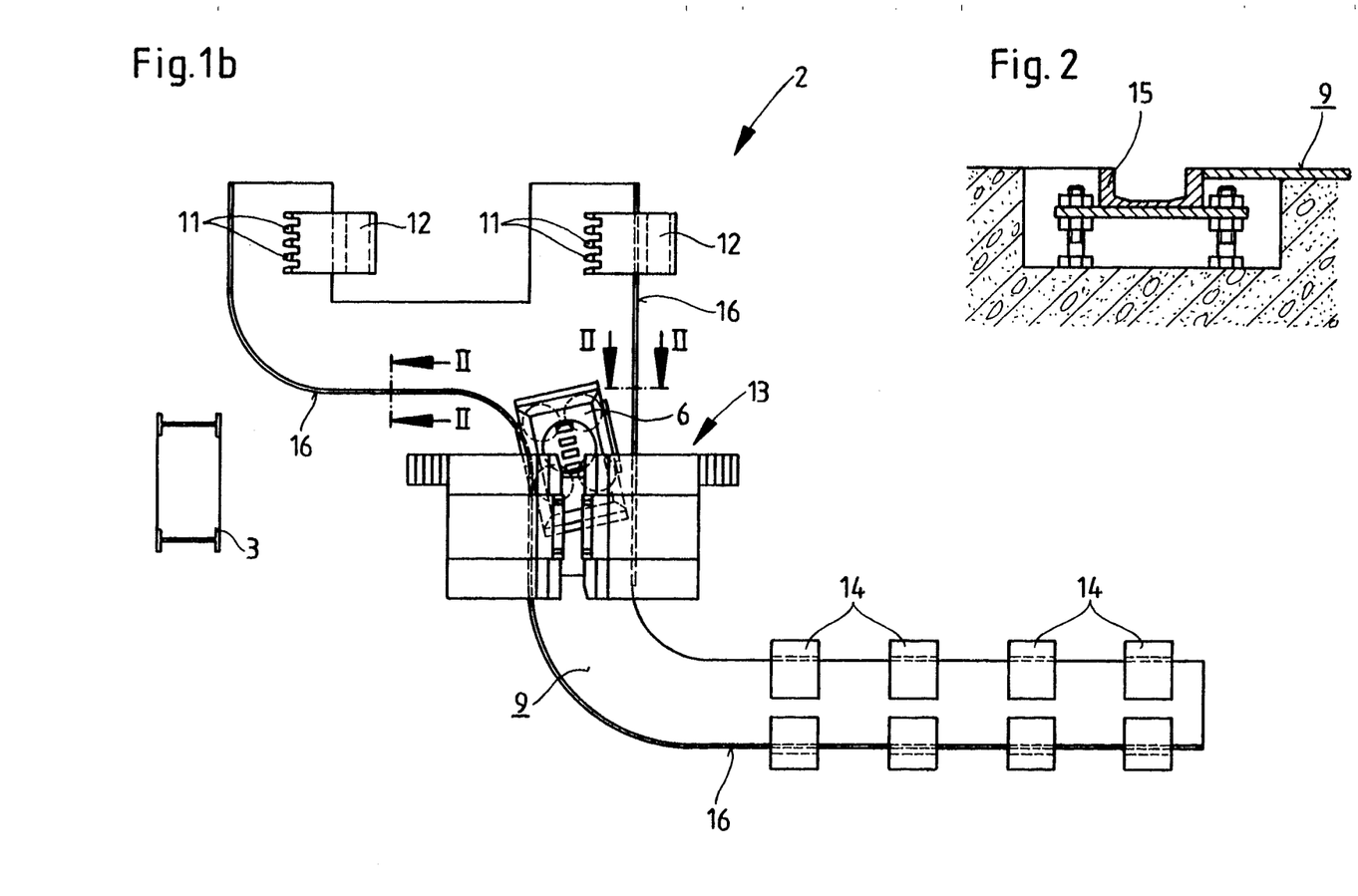
FIG. 2 is a cross-sectional view along line II—II of FIG. 1a or FIG. 1b through U-shaped guide rails for the air cushion vehicles anchored in the mill floor.
Figure 6:
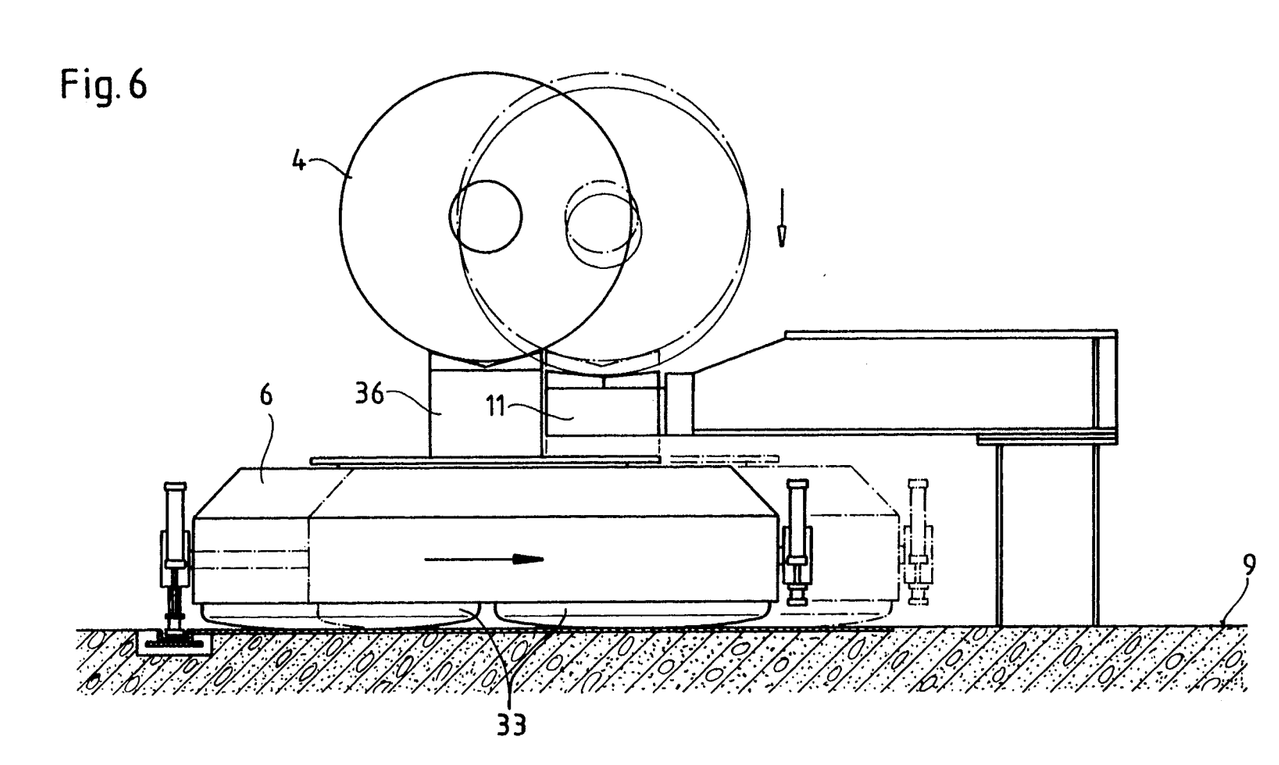
FIG. 6 is a side view of a centilevered coil support configured with prongs at the front end with its allocated air cushion vehicle ready for delivery.

Referring now to the drawings wherein like numerals reflect like elements throughout the several views, FIGS. 1a and 1b depict respectively the entry part 1 and the delivery part 2 of a strip treatment or processing installation containing numerous stations and treatment segments not shown in detail. An overhead crane, working in the coil depository hall of the treatment installation, deposits the coils 4 (compare FIG. 6) which possibly weigh more than 30 tons, upon the coil depositories 5 of which a total of four exists in FIG. 1a.

An air cushion vehicle 6 can travel along the middle and beneath the coil depository 5. The vehicle lifts a coil 4 from one of the coil depositories 5 and transports through an intermediate station 7 (where the coil is identified, the diameter and strip width are measured and the baling cord is removed) to the coil depositories 8 or 12, which are at the interface of the mechanically guided coil transport system, by air cushion vehicles 6 to a conveyance by conventional coil lifting trolleys to or from the reel-up station.

Figure 7:
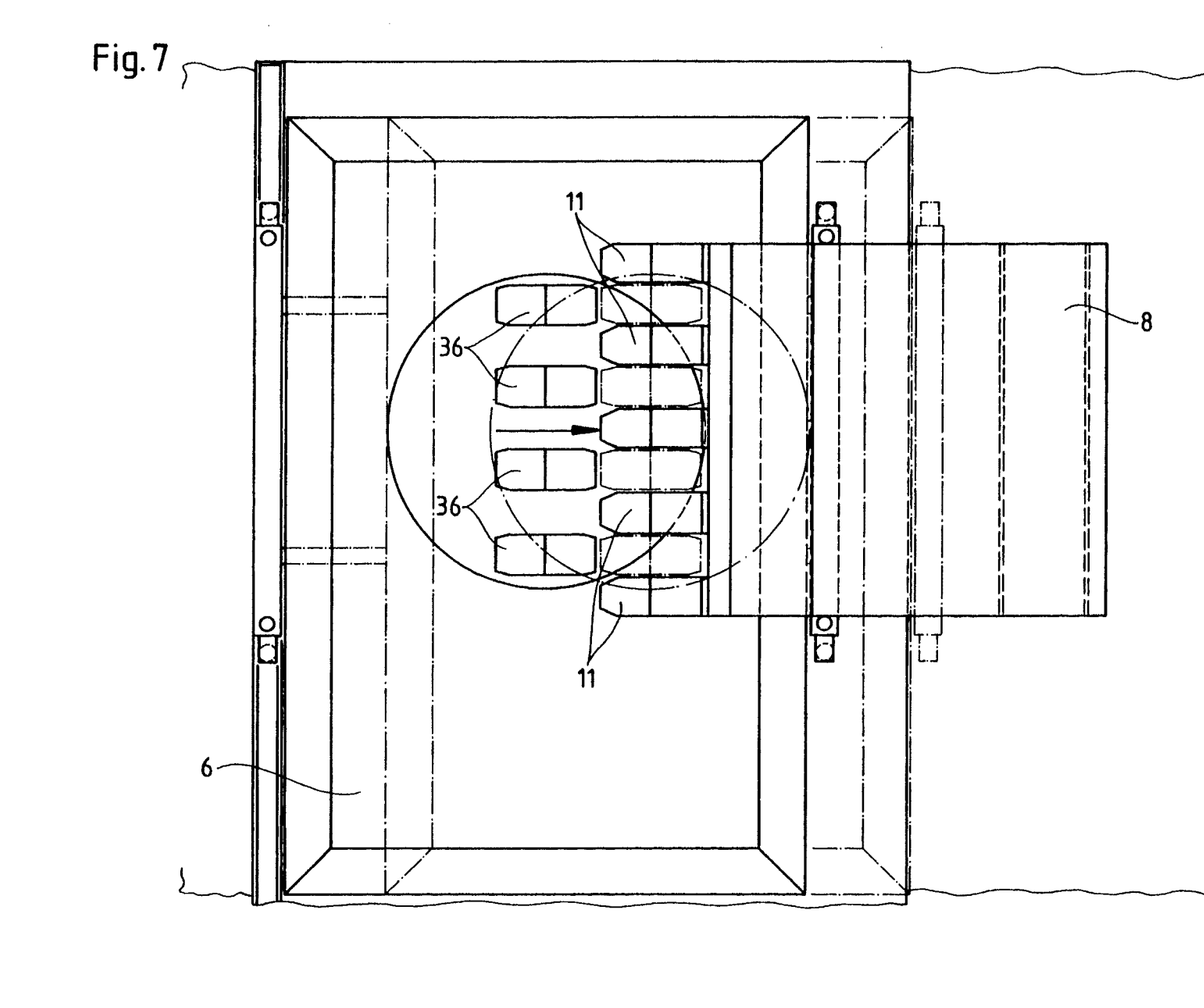
FIG. 7 is a plan view of the coil support with the air cushion vehicle in FIG. 6.

The coil depositories 8 or 12, firmly anchored in the mill or shop floor 9, are designed to be cantilevered (compare FIG. 6) and equipped with prongs 11 an the front and in a fork-like fashion (compare FIG. 7). The outlet part 2 in FIG. 1b does not essentially differ from the entry part 1 in FIG. 1a and comprises a mechanically guided air cushion vehicle 6 apart from two coil depositories 12 equipped with prong-line cantilevers, an intermediate station 13, as well as coil depositories 14, with the air cushion vehicle again traveling centrally and beneath the coil depositories 14.

Figure 3:
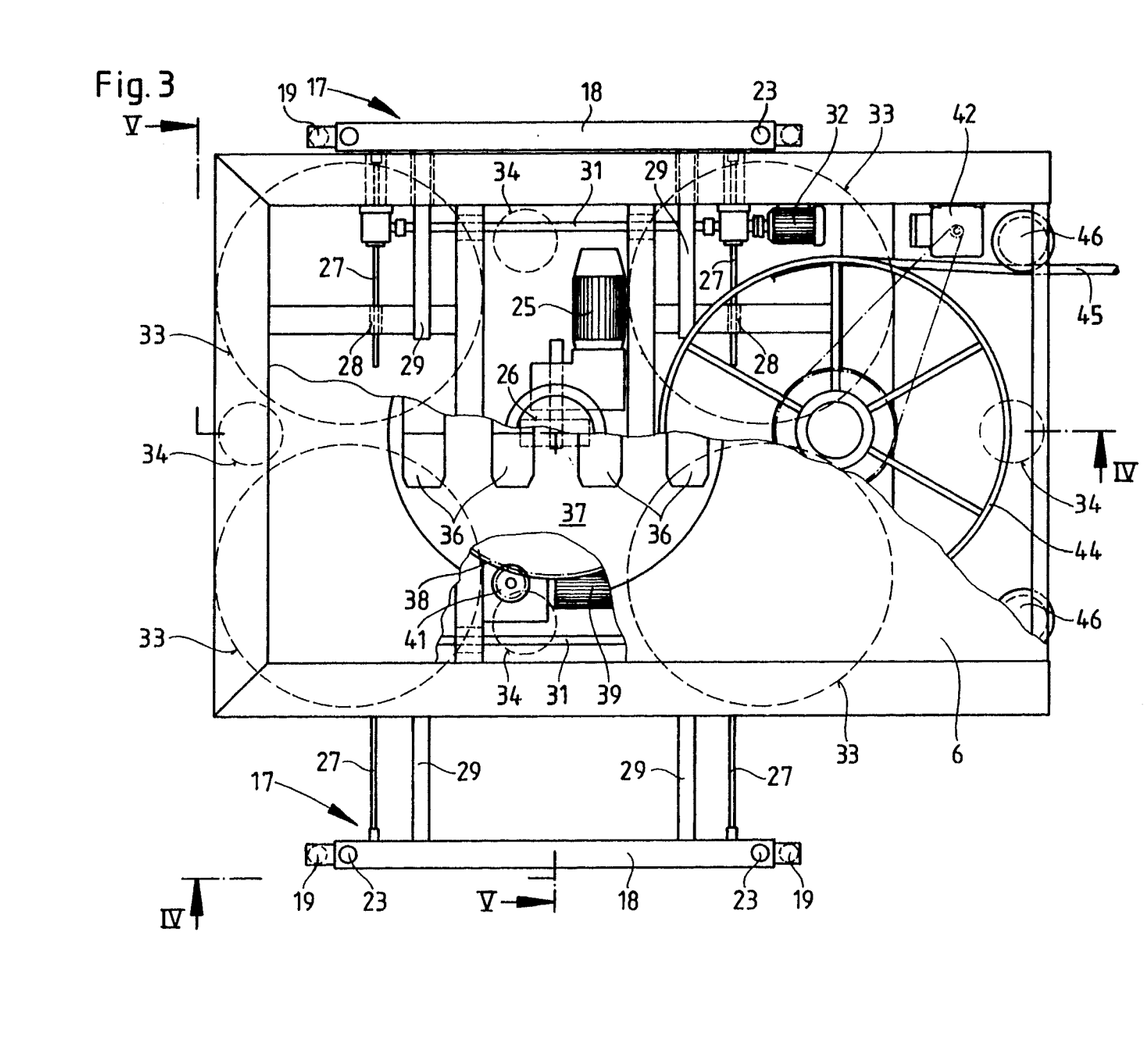
FIG. 3 is a plan view of the air cushion vehicle per the invention.
Figure 4:
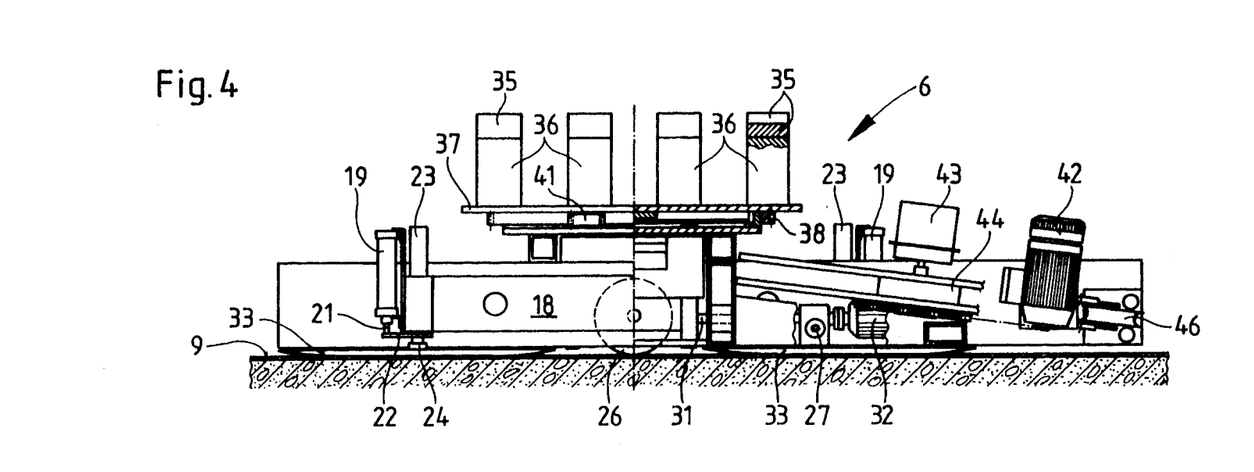
FIG. 4 is a cross-sectional view of the air cushion vehicle sectioned along line IV—IV of FIG. 3.

The U-shaped rails 15 are firmly anchored (compare FIG. 2) in the shop floor 9 and are configured as routing guides 15 for the air cushion vehicles for mechanical guidance of vehicles 6, of which one operates in the entry as well as in the delivery or outlet part 1, 2. The U-rails 15 or routing guides 16 cooperate with side guides 17, of which one is disposed at each longitudinal side of the air cushion vehicle 6, as is shown in FIG. 3. Each side guide 17 comprises longitudinal beams 18, carrying vertically disposed pneumatically actuated cylinders 19 at its end, whose piston rods 21 are connected by an arm 22 (compare FIG. 4) with vertical slide rods 23 guided in the longitudinal beams 18. The slide rods 23 are provided at their floor end with support or back-up rollers 24, which can carry radial and horizontal forces. It is possible, by means of the cylinder 19, selectively to lower either the left side guide of the air cushion vehicle 6 into the U-rails 15 allocated to them in the shop floor 9. Thus, the air cushion vehicle 6 travels towards the desired area, guided in a constrained manner. Motor 25 drives a friction wheel 26 (compare FIGS. 3 and 4) for moving the air cushion vehicle 6.

For driving the air cushion vehicle 6, transversely to the direction of travel, the longitudinal beams 18 of the side guide 17 are equipped with threaded spindles 27 extending inside the vehicle, where they are screwed into threaded receptacles 28 (compare the upper half of FIG. 3). Furthermore, guide rods 29 extending inside the vehicle are connected to the longitudinal beams 18. These rods assure a tilt or jamfree displacement during transverse travel of the air cushion vehicle 6. The two threaded spindles 27, of each side guide 17, are mechanically synchronized by a drive shaft 31 and can be operated by a common electric motor 32. The side guides 17 are shown in an extended position in the lower half of FIG. 3 and in the retracted position in the upper half of FIG. 3.

Figure 5:
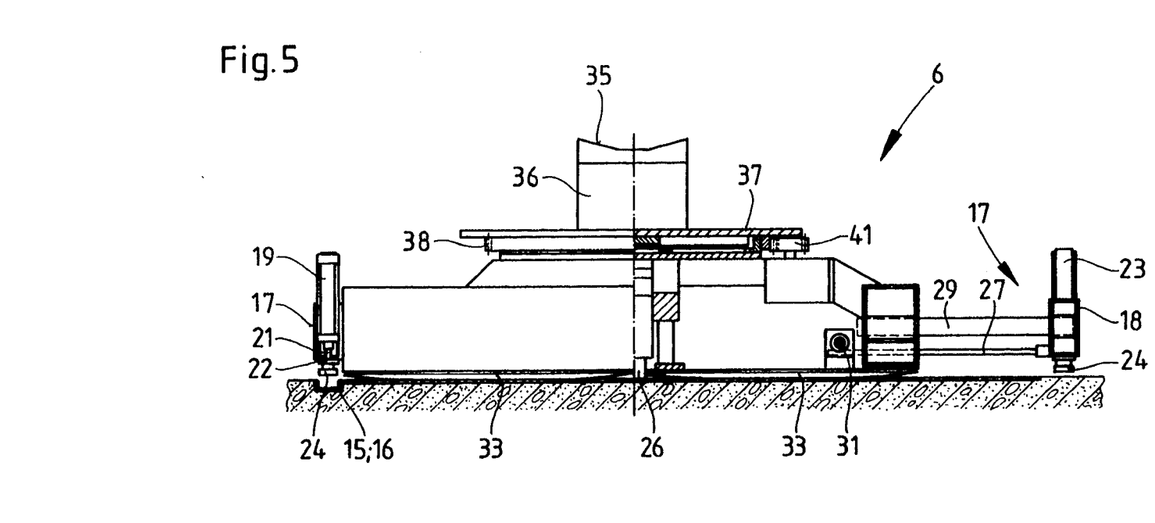
FIG. 5 is a cross-sectional view of the air cushion vehicle along line V—V of FIG. 3.

Four pressurized load air cushions 33 and four idling air cushions 34, which are considerably smaller than the load air cushions 33, are disposed at the bottom side (i.e. the base) of the air cushion vehicle 6 compare FIG. 3). The load air cushions or idling air cushions 33, 34 assure that a layer of air forms beneath the vehicle. The load air cushions 33 are blown up or pressurized when conveying a coil. In idling operation of the air cushion vehicle 6, the idling air cushions 34 are blown up so that the load (vehicle or vehicles plus coil) floats or hovers practically friction-free above the shop floor 9. The air cushion vehicle has, on its top side, four spaced-saddles 36 provided with troughs or depressions 35 for receiving a coil 4. The support saddles are disposed on a 360° rotary turntable rim 37 with a pinion 41 driven by a motor 39 meshing with the rim external toothing (compare FIGS. 3 and 5). A hose drum 44, driven by a slip ring device 43 and an electric motor 42, helps provide a very compact construction of the air cushion vehicle on the shop floor. This hose drum 44, deposits, in the course of travel, the pneumatic hose 45 on the shop floor. It contains an electric cable in its inside for supplying the electric apparatus and is connected to a compressor which is not shown. The pneumatic hose 45 can be rolled off and on without hindrance because the hose 45 is guided over a roller 46 supported at the air cushion vehicle 6.

The functional or operational sequence in the entry part 1 of the treatment installation is described, wherein the entry part 1 is allocated to two reel-off installations (not shown). The sequence in the delivery or outlet part 2 allocated to the two coiler-reelers is correspondingly performed in reverse. The air cushion vehicle 6 operating in the entry part 1, travels in the middle of and beneath the closest coil in the coil depositories 5, wherein the idling air cushions 34 only are blown up and the curve-shaped side guides 17 allocated to the routing guide 16 (shown on the left hand side in FIG. 1a) have been lowered together with their back-up or support rollers 24 into the U-rail 15.

As soon as the air cushion vehicle 6 is located precisely below the coil in the coil depository 5, the load air cushions 33 are blown up and the air cushion vehicle 6 takes over the coil from the coil depository 5, meaning it lifts the same from the depository so that a conveyance to the next station, namely the intermediate station 7, is possible. There the coil is identified, the diameter and the strip width are measured and the baling cord is removed. Should the windoff position of the strip starting end of the coil necessitate this, the coil resting in the troughs or depressions 35 upon the support saddles 36 can be turned into the desired position by the rotary tooted rim 37.

After its identification, it is decided whether the coil can be directed to the first or second takeoff reeler ready for receiving the same. Wrong or out-of-order coils are transported back into the coil storage hall. If the air cushion vehicle 6 is given the signal by the higher order control for conveying the coil into the coil depository 8 (shown on the left hand side in FIG. 1a), the support rollers 24 of the side guide 17 of the air cushion vehicle 6, allocated top the curve-shaped routing guide 16, remain also in engagement with the U-rails 15 anchored in the shop floor 9 (compare FIG. 2) even after the intermediate station 7. If, on the other hand, the coil is to be transported from the intermediate station 7 into the coil depository 8 (shown on the right hand side in FIG. 1a), the support rollers 24 allocated to the curve-shaped side guide are raised and support rollers 25 of the oppositely located side guide 17 are lowered into the U-rails 15 of the routing guide 16, running in a straight line in FIG. 1a.

As shown in FIG. 1, the air cushion vehicle 6 conveys the coil into the coil depository 8 (shown on the left hand side in FIG. 1a). The air cushion vehicle 6 is positioned there in such a way that the empty spaces between the support saddles 36 lie precisely in front of the prongs 11 of the cantilevered coil depository 8, open towards the front (compare FIG. 7). In this position, the electric motor 32, allocated to the threaded spindles 27 of the side guide 17, lowered into the U-rail, is operated so that the threaded spindles 27 are unscrewed out of the internal space of the vehicle and the air cushion vehicle 6 travels transversely to the normal travel direction (meaning towards the right side in FIG. 1a) into the coil depository 8, guided by the guide rods 29. During the transverse travel, the friction wheel drive is raised and the support rollers 24 abut in the firmly anchored U-rail 15. As soon as the air cushion vehicle has reached its end position in the coil depository 8 (compare the vehicle shown in dash-dotted lines in FIG. 6), the load air cushions 33 are switched off and therefore the air cushion vehicle 6 is lowered, wherein the coil 4 is deposited upon the prongs 11 of the coil depository 8 (compare the lowered coil shown in dash-dotted lines in FIG. 6).

The load air cushions 33, which have been emptied in the course of the lowering process, are not blown-up again. Instead, the idling air cushions 34 are switched on, which then only carry the inherent weight of the air cushion vehicle 6. The lifting height of the idling air cushions 34 is such that adequately large intermediate space remains exposed between the coils 4 lying upon the prongs 11 of the coil depository 8 and the upper edge of the support saddles 36 of the air cushion vehicle 6. By reversing the direction of rotation of the threaded spindles 27, the air cushion vehicle 6 is then moved transversely out of the coil depository 8. The air cushion vehicle 6, which is now ready in traveling position upstream of, or in front of the coil depository, is then moved back into the coil storage hall 3 containing the coil depository 5 in order to convey an additional coil into the coil depository 5. In this position, it cycles the coils in such a way already during the coil turning period of the wind-off reeler, that the foremost coil depository point 5 (shown on the right side in FIG. 1a) is occupied by a coil ready to be picked-up and that the coil depository 5 (on the left side if FIG. 1a) is free for being supplied with a new coil by the overhead crane.

While, the preferred embodiments of the invention have been described in detail, modifications may be made thereto without departing from the spirit and scope of the invention, as delivered in the following claims:

What is claimed is:

1. A coil transportation system for straight line and curvilinear travel, comprising:
an air cushion vehicle having longitudinal sides;
side guides at said longitudinal sides;
means for mechanically actuating said side guides alternately on said longitudinal sides;
routing guides provided on a surface for associating with the side guides;
said means for mechanically actuating including means for raising and lowering each of the side guides, said raising and lowering means comprising:
pneumatically actuatable cylinders vertically disposed at the ends of a longitudinal beam mounted to the; and
raisable and lowerable support rollers connected to said cylinder; and
means for moving said side guides horizontally inward and outward for enabling transverse travel of the air cushion vehicle.

2. The coil transportation system of claim 1, wherein said moving means comprises:
guide rods connected to said longitudinal beam;

threaded spindles connected to said longitudinal beam and extending inside the vehicle; and threaded receptacles provided in the vehicle, wherein said threaded spindles are disposed in the threaded receptacles.

3. The coil transportation system of claim 2, further comprising:

a drive motor; and a common drive shaft for connecting the threaded spindles, wherein said common drive shaft is connected to the drive motor.

4. The coil transportation system of claim 3, further comprising:

slide rods guided in said longitudinal beam, said support rollers disposed at the slide rods; and at least one arm for connecting said slide rods to said cylinders.

5. The coil transportation system of claim 4, wherein the air cushion vehicle is equipped with idling air cushions.

6. The coil transportation system of claim 5, wherein the air cushion vehicle comprises support saddles disposed on a turntable.

7. The coil transportation system or claim 6, wherein the air cushion vehicle is equipped with a power driven hose drum.

* * * * *